March 26, 1940.  B. A. WOINA  2,195,349
SEAT SLIDE STRUCTURE
Filed March 24, 1939  2 Sheets-Sheet 1
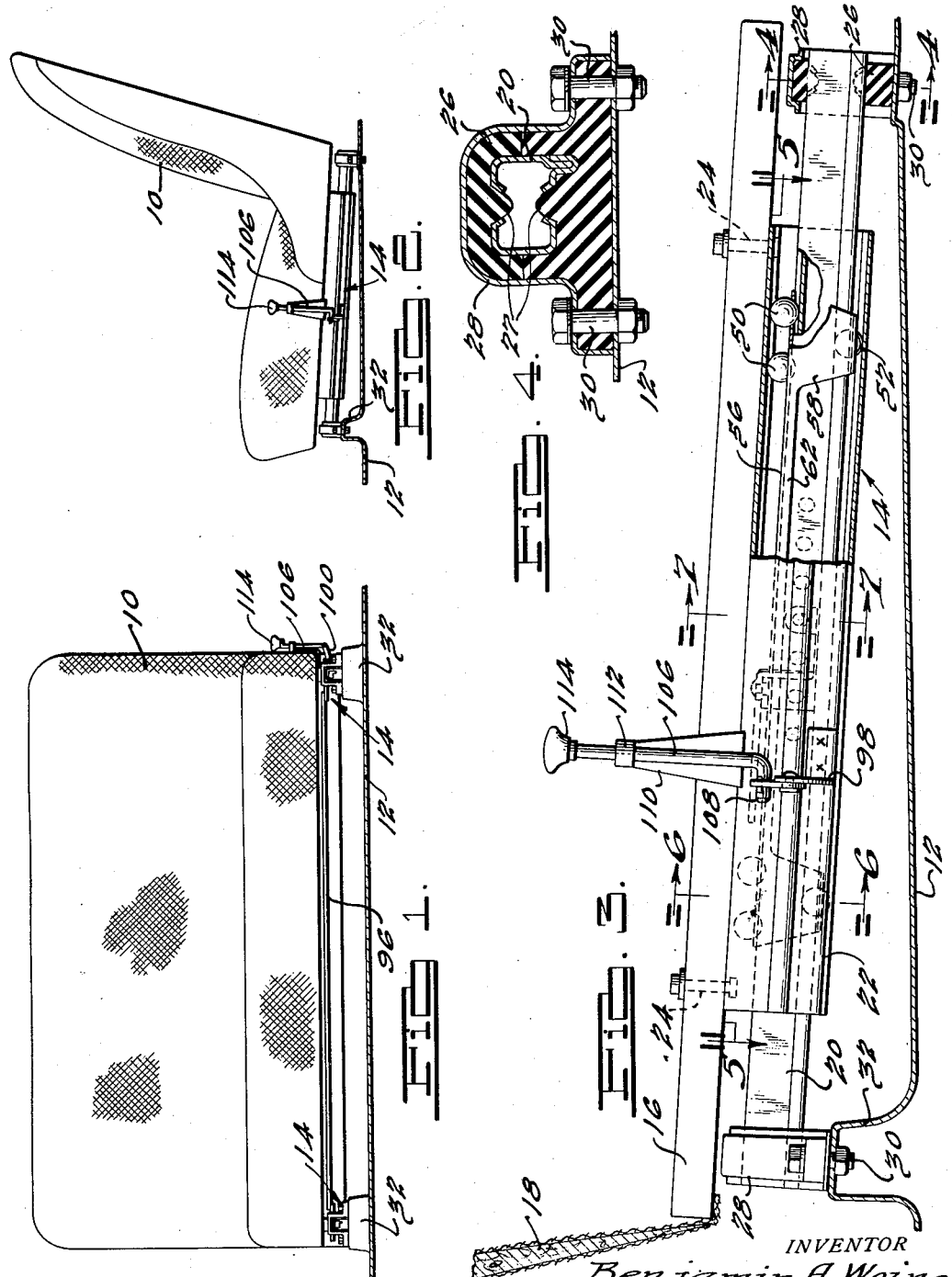
INVENTOR
Benjamin A. Woina.
BY Harness, Dickey & Pierce.
ATTORNEYS.

March 26, 1940. B. A. WOINA 2,195,349
SEAT SLIDE STRUCTURE
Filed March 24, 1939 2 Sheets-Sheet 2
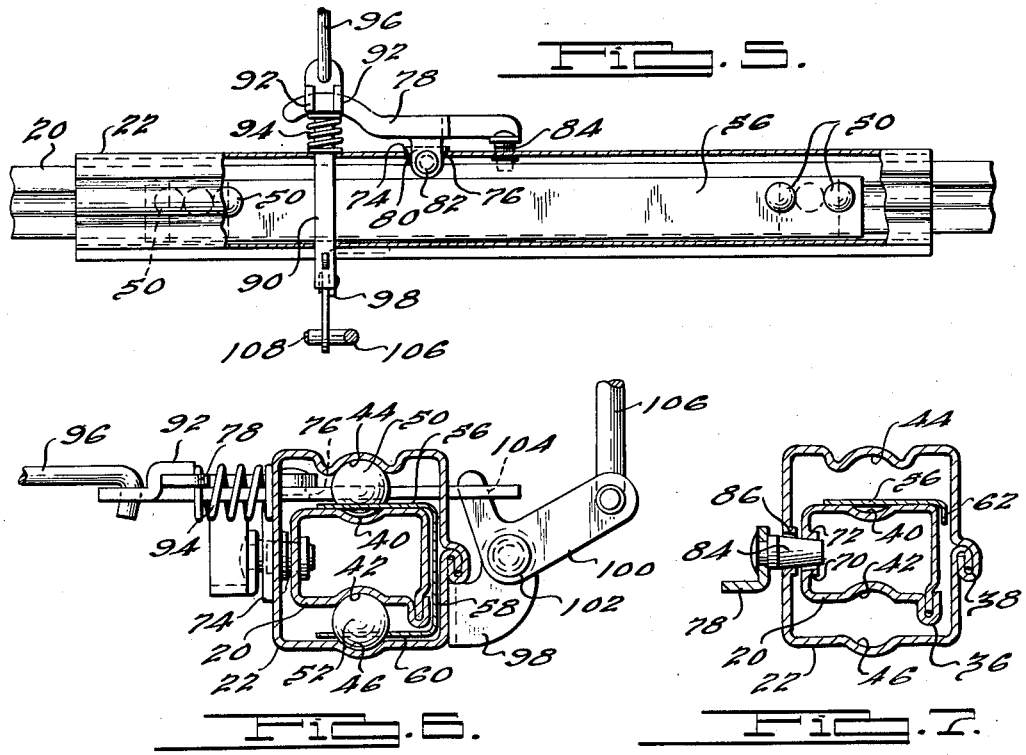
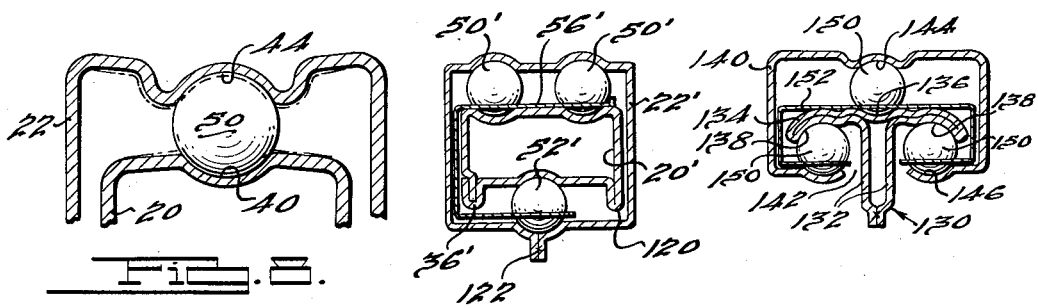
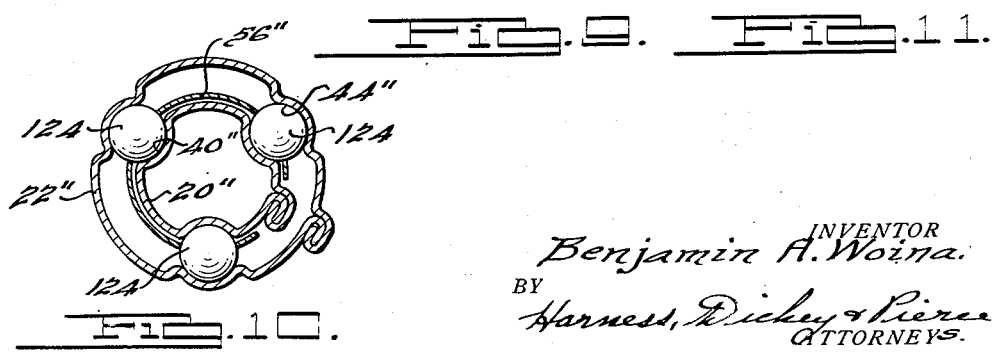
INVENTOR
Benjamin A. Woina.
BY
Harness, Dickey & Pierce
ATTORNEYS.

Patented Mar. 26, 1940

2,195,349

UNITED STATES PATENT OFFICE 2,195,349

SEAT SLIDE STRUCTURE

Benjamin A. Woina, Detroit, Mich., assignor to L. M. Payne Company, Detroit, Mich., a corporation of Michigan Application March 24, 1939, Serial No. 263,962

8 Claims. (Cl. 155—14)

This invention relates to seat slide structures and particularly to that type thereof adapted to adjustably and slidably support the front seat of an automobile so as to enable the driver thereof to properly position himself with respect to the steering wheel, control pedals and the like, the principal object being the provision of a seat slide mechanism of this general character that is simple in construction, efficient in operation and economical to manufacture.

Other objects of the invention include the provision of a seat slide structure including a pair of tubular parts arranged in telescopic relationship and having anti-friction elements interposed therebetween; the provision of a seat slide structure of the type described including a pair of telescopically arranged members and anti-friction means spacing one of the members interiorly of the other, the members and the anti-friction elements being so proportioned and arranged that the anti-friction elements are maintained under a compressive stress between the members; the provision of a seat slide structure of the type described in which one member is telescopically received within another and anti-friction elements are interposed between the members to maintain one of the members interiorly spaced with respect to the other, the spacing of the members in free condition being less than that required to receive the anti-friction elements between them and at least one of the elements being yieldable whereby in assembling the members with the anti-friction elements between them it will yield to permit insertion of the anti-friction members and thereafter serve to maintain the anti-friction elements under a compressive stress between the members; the provision of a seat slide structure having relatively slidable members of novel conformation; and the provision of a seat slide mechanism of the type described constructed of sheet metal in a novel manner.

Other objects of the invention include the provision of a seat slide structure having a novel means for mounting the same on the floor of an automobile or other supporting surface; the provision of a novel form of mechanism for supporting a seat slide mechanism tending to deaden the transmission of vibration and sounds from the supporting surface to the seat; and the provision of a novel rubber mounting for seat slide construction.

A further object of the invention is the provision of an improved latch structure for releasably latching two relatively slidable parts of a slidably adjustable seat slide structure against movement.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a front elevational view of a seat of the type employed in an automobile illustrating the same supported from a floor by means of seat slide structures formed in accordance with the present invention;

Fig. 2 is a side elevational view of the seat shown in Fig. 1;

Fig. 3 is a fragmentary, partially broken, partially sectioned view taken in a vertical plane passing longitudinally through the seat shown in Figs. 1 and 2 and illustrating the righthand support as viewed in Fig. 1 in side elevation;

Fig. 4 is an enlarged transverse sectional view taken on the line 4—4 of Fig. 3;

Fig. 5 is a partially broken, partially sectioned plan view, taken on the line 5—5 of Fig. 3 and particularly illustrating the latching member associated with the corresponding seat slide;

Fig. 6 is an enlarged fragmentary transverse vertical sectional view taken on the line 6—6 of Fig. 3;

Fig. 7 is an enlarged transverse sectional view taken on the line 7—7 of Fig. 3;

Fig. 8 is a still further enlarged and more or less diagrammatic transverse sectional view taken through the seat slide shown in the previous views and particularly bringing out the manner in which the walls of the slidable members are sprung due to insertion of the anti-friction balls.

Figs. 9, 10 and 11 are views similar to that shown in Fig. 6, without the accompanying latch mechanism, and illustrating modified forms of the construction applicable to the type of construction shown in the previous views.

Referring to the drawings and particularly to Fig. 1, a conventional seat is indicated generally at 10 of a type commonly employed as the driver's seat of an automobile. The seat 10 is supported upon the floor 12 by means of a pair of supporting devices indicated generally at 14, one positioned adjacent each side of the seat 10 and extending in approximate parallelism with respect to the corresponding side thereof and in parallelism to each other. The supporting devices 14 are identical in construction except the righthand one thereof as viewed in Fig. 1 is provided with a latch operating mechanism capable of operating the latches on both of the devices 14, and consequently a description of one of the supporting devices will suffice as a description of both such devices and inasmuch as the righthand device 14 includes the latch operating mechanism this device will be described so as to also explain the construction and operation of this part of the mechanism.

Referring to Fig. 3 it will be noted that the seat 10 includes the usual rigid seat bottom frame 16 and padded covering 18 and that the supporting device 14 is interposed between the frame 16 and the floor 12. The supporting device 14 includes a supporting part or rail 20 adapted to be fixed relative to the floor 12 and a slide 22 adapted to be fixed to the seat bottom frame 16 as by means of screws 24. Both the members 20 and 22 are of tubular construction and as perhaps best seen in Fig. 7 of approximately rectangular cross-sectional configuration, the rail 20 being telescopically received within the slide 22 in generally spaced relation to all of the walls thereof. As best indicated in Fig. 3 the rail 20 is of materially greater length than the slide 22 and its opposite end portions project outwardly beyond the corresponding ends of the slide 22 and it is through these projecting ends that the rail 20 is supported from the floor 12.

The means for supporting the rail 20 from the floor 12 forms one of the features of the present invention and includes, as best brought out in Figs. 3 and 4, a block 26 which, in the broader aspects of the invention, may be formed of any suitable non-metallic yieldable vibration or shock and sound absorbing material but is preferably formed from rubber to the shape indicated. A block 26, which may be either of a single or multipart construction, is provided in surrounding relationship with respect to the opposite end portions of the rail 20 and is preferably fixed thereto in any suitable manner and which in the case where the block 26 is formed of rubber, may be by vulcanization, or it may have projections such as 27 received in cooperating openings in the rail 20 as shown. The blocks 26 are fixed with respect to the floor 12 by means of an encompassing clamping member 28 and bolts 30. Where the blocks 26 are not fixed or adhered to the rail 20 they may be so proportioned with respect to the associated clamping member 28 that when the clamping member 28 is drawn firmly down into contact with the floor 12 the material from which the block is formed will be compressed to a sufficient extent about the rail 20 to grip it and hold it against inadvertent movement.

Where it is desired that the seat 10 slide in a plane parallel to the floor 12, the clamping members 28 may be secured directly to the floor, but where, as is usual, it is desired that the seat 10 be elevated as it is moved forwardly in its adjustable movement, then brackets or legs may be substituted for the front clamps 28, or spacers may be employed under the front clamps 28, or resort may be had to the construction illustrated in the drawings by means of which a similar effect is obtained. This comprises forming upwardly extending stools or bosses 32 in the floor under the front end of each of the supporting devices and in a position to receive the corresponding block 26 and clamp 28 thereon. The stools 32 thus serve to elevate the front end of the rail 20 with respect to the rear end thereof to obtain the desired effect as described above. In the event the front end of the rails 20 are elevated as described by the construction shown, it is preferable to incline the upper face of the stools 32, as well as the floor 12 at the point where the rear blocks 26 and rear clamps 28 cooperate therewith as indicated in Fig. 3, so as not to subject the rail 20, blocks 26 and clamps 28 to any unusual or unnecessary stresses. It will be observed that in supporting the rails 20 in the manner described a more or less resilient or at least yieldable connection is provided between each end of the rail 20 and the floor 12 and this has the effect of deadening the transmission of vibration and noises from the floor 12 to the seat and therefrom to the passengers occupying the seat. The blocks 26 also being yieldable it will be observed that any usual mis-alignment of the parts may be compensated for or at least materially reduced because of the yieldability of the blocks 26.

In the broader aspects of the invention the rail 20 and slide 22 may be formed from any suitable material and in any suitable manner. They may be made of seamless or other suitable tubular stock or they may be made by a stamping process and folded or bent to the shape shown. This latter method is considered to be the most economical from a manufacturing standpoint and, accordingly, the rail 20 and slide 22 are illustrated as being formed in this manner, the opposite edges of the strips from which these parts have been formed being shown as brought together to form seams 36 and 38, respectively, best illustrated in Fig. 7, in order to present the desired tubular cross-sectional configuration. It will, of course, be understood that the particular location of seams 36 and 38 around the periphery of the rail 20 and slide 22, respectively, is unimportant as long as they are located out of interfering relation with other parts of the strucure.

As illusrated best in Figs. 6 and 7 the upper horizontal wall of the rail 20 is formed to provide centrally thereof an upwardly opening groove or trough 40 of partially circular section forming a raceway and preferably extending the full length thereof, and its lower horizontal wall is similarly formed to provide a similar downwardly opening raceway 42. The upper horizontal wall of the slide 22 is centrally formed to provide a downwardly opening trough or groove 44 providing a downwardly facing raceway of partially circular section lying in opposed relation with respect to the raceway 40 and the bottom horizontal wall of the slide 22 is centrally formed to provide a similar upwardly opening raceway 46 lying in opposed relation with respect to the raceway 42. Adjacent each end of the slide 22 a pair of ball bearings 50 are interposed between the raceways 40 and 44, the balls of each pair being preferably in slightly spaced relation longitudinally of the slide 22. Preferably at a point intermediate the ball bearings 50 of each pair a third ball bearing 52 is interposed between the raceways 42 and 46. It will be noted that the various raceways are formed to substantially conform to the curvature of the cooperating ball bearings 50 and 52, respectively, so that the ball bearings not only serve to space the rail 20 and slide 22 in a vertical direction but also serve to maintain them in properly spaced relation in a horizontal direction. The ball bearings 50 serve to transmit the weight of the seat 10 and its occupants from the slide 22 to the rail 20 and the ball bearings 52 serve mainly to maintain the spaced relation of the rail 20 with respect to the slide 22 as previously described as well as for an additional important purpose which will be mentioned later. The ball bearings 50 thus serve as rolling elements serving to slidably support the slides 22 and consequently the seat 10 upon the rails 20 for movement longitudinally of the rails within the limits of movement of the slide 22 between the opposite blocks 26.

The position of the ball bearings 50 and 52 with respect to each other is controlled by means of a cage element which as best illustrated in Figs. 5, 6 and 7 comprises a substantially flat strip 56 of sheet material which overlies the upper face of the rail 20 within the slide 22 and extends from a point outwardly beyond the outer ball 50 at one end to a similar position beyond the outer ball 50 at the opposite ends of the bearings 50 the strip location of each of the ball bearings 50 the strip 56 is provided with an opening therein permitting the corresponding ball bearing 50 to project therethrough but preventing material displacement of each ball bearing 50 with respect to strip 56 axially of the rail. The strip 56 adjacent each end thereof is provided with an extension 58, as best illustrated in Figs. 3 and 6, which extends downwardly between the adjacent side walls of the rail 20 and slide 22 to a point below the rail 20 and then turns inwardly as at 60 and is provided with an opening for receiving the corresponding ball bearing 52 therein. Between the portions 58 the corresponding marginal portion of the strip 56 is preferably downwardly bent as at 62 to provide added longitudinal rigidity to the strip 56. It will be recognized that this cage formed by the strip 56 and its connected portions will serve at all times to maintain the relative spacings and positions of the ball bearings 50 and 52 during sliding movement of the seat, but it will be appreciated that because of the rolling action of the balls 50 and 52 between the rail and slide the bodily displacement of the balls and of the cage will be only half of that of the slide 22.

An important feature of the present invention is the manner in which the ball bearings 50 and 52 are received between the rail 20 and slide 22. The rail 20 and slide 22 are initially formed so that the distance between the races 40 and 42 and between the races 42 and 46 is less than that required to freely receive the corresponding balls 50 and 52 therebetween. The material from which the rail 20 or the slide 22, or both thereof, is formed is such, for instance as regards thickness and yieldability, as to enable one or both of them to be slightly distorted under pressure and this enables the balls 50 and 52 to be forced between their respective races and when received thereby to be maintained under compression between their respective races. Referring to Fig. 8 in which it is assumed that both the rail and slide are yieldable in the respect just mentioned, the difference in the position of the races 40 and 44 in their initial or free condition and in the relation which they assume when the ball bearings 50 are interposed between them is illustrated in exaggerated form. When these parts are assembled with the ball bearings 50 between them they assume the position illustrated in solid lines but before the ball bearings 50 are assembled between them they assume the position illustrated in the dotted lines. Upon forcing the ball bearings 50 between the races 40 and 44 the upper walls of the rail and slide are forced away from one another sufficiently to receive the ball bearings 50 between them. It will be appreciated that the actual amount which it is necessary to distort these walls in order to force the ball bearings 50 between them need not be great and in actual practice will usually be sufficient if the ball bearings 50 and 52 are approximately $3/1000$ths. of an inch to $5/1000$ths. of an inch greater in diameter than the free space existing between the corresponding races. In any event it is preferable that the amount which the walls of the rail and/or the slide are thus distorted by forcing the ball bearings 50 and 52 between them is not sufficient to stress the walls of the slide and the rail beyond the elastic limits of the material from which they are formed, and in such case it will be appreciated that the stresses thus set up in the material will be resisted by the ball bearings which are then maintained under a corresponding compressive stress between their respective races after assembly.

This feature of maintaining the ball bearings 50 and 52 under compression and the upper and lower walls of the rail and of the slide under stress in assembly positively eliminates any possibility of rattle of any sort whatever developing between the rail and the slide, and this without affecting the ease of sliding movement of the slide on the rails, particularly when under load of a passenger on the seat 10, in any material respect whatever. It will be understood that the ball bearings 50 and 52 in being resiliently maintained in position between their corresponding races in the rail and slide, and in being positioned at opposite ends of the slide, not only serve to maintain the desired spaced relation of the slide and rail but also act to reinforce one another of the latter elements against torsional and other stresses and because the only contact between the rail and slide can be through the rolling antifriction element no possibility of undue friction developing in use is possible even though the parts may be distorted.

In order to latch the seat 10 and the slides 22 in their slidably adjusted position longitudinally of the rail 20 the following mechanism is provided. The latching mechanism for both of the supporting devices 14 are identical and consequently a description of the one shown will be sufficient to describe both. As best illustrated in Figs. 3, 5 and 6, the lefthand sides of the rails 20 as viewed in Fig. 1 are provided with a series of openings 70 therethrough in alignment with each other longitudinally of the rails. As best brought out in Fig. 7, in forming the openings 70 a portion of the metal of the rail about the margins of each of the openings is inwardly bent as at 72 to form a short collar and the walls of the opening are inwardly tapered to present a frusto-conical surface. A bracket member 74 is fixed, as by spot welding or the like, to the outer face of the corresponding wall of the slide 22 and it is provided with an inwardly turned upper end 76 projected through a suitable opening provided therefor in the corresponding side wall of the slide 22. A double armed lever 78 is positioned outwardly of such side wall and is provided with an inwardly extending tongue 80 which is pivotally secured to the end 76 by means of a rivet or pin 82, thus supporting the lever 78 for movement in a horizontal plane. The righthand end of the lever 78 as viewed in Fig. 5 is downwardly offset from the main portion thereof and at its outer end carries an inwardly extending frusto-conical pin 84 which projects through an opening 86 provided in the corresponding side wall of the slide 22 therefor. It will be noted from an inspection of Fig. 7 that the opening 86 is inwardly flanged and coned or tapered in a manner similar to the openings 70 previously described. The opening 86 and consequently the pin 84 are arranged in approximately vertical alignment with the various openings 70 but as illustrated in Fig. 7 slightly above the same so that the pin 84 when projected through the opening 86 and into one of the openings 70 will preferably bear against the lower edge of the opening 86 and the upper edge of the corresponding opening 70, thereby obtaining a wedging effect tending to hold these parts against rattling in service.

In order to operate the double armed lever 78, in transverse alignment with the outer end thereof a bar 90 is projected through and guided by suitable openings provided in the side walls of the slide 22 intermediate the top of the rail 20 and the top wall of the slide 22, the lefthand end of the bar 20 as viewed from the front lying immediately under the lefthand end of the lever 78 as viewed in Fig. 5. A pair of lugs 92 are bent upwardly from each side of the bar 90 as best brought out in Figs. 5 and 6 and extend in overlapping relation with respect to the upper surface of the corresponding end of the lever 78 so as to confine such end between them and the main portion of the bar 90. A coil spring 94 surrounds the bar 90 between the end of the lever 78 and the corresponding side wall of the slide 22 and is maintained under compression therebetween so as to constantly urge the pin 84 towards engaging relation with one of the openings 70 in the rail 20.

At this point it may be noted that the bars 90 of the supporting devices 14 at opposite sides of the seat 10 are interconnected for equal movement by means of a rod 96 extending between them and having downwardly bent ends engaged in suitable openings in the adjacent ends so that movement of one of the bar members 90 insures equal movement of the other one thereof.

In order to operate one of the bars 90 and thereby enable retraction of the pins 84 from their corresponding openings 70 and thus condition the seat 10 for sliding movement, the following mechanism is provided. As best illustrated in Figs. 3, 5 and 6 an angle bracket member 98 is fixed as by welding or the like to the outer side face of the righthand slide 22 as viewed in Fig. 1 with one arm thereof projecting in a vertical plane perpendicularly to the corresponding side wall of the slide 22. A bell crank 100 is pivoted to the outer end of the outstanding arm of the bracket 98 as by means of a rivet 102 and one arm of the bell crank is projected through an opening 104 formed in the corresponding end of the bar 90. A vertically extending rod 106 is provided with a horizontally bent end portion 108 which is engaged in a suitable opening formed in the free end of the remaining arm of the bell crank 100 and suitably fixed against inadvertent retraction therefrom. The upper end of the rod 106 extends alongside of the bottom for the seat 10 and is slidably supported in such position by means of a bracket 110 fixed to the slide 22 and extending upwardly therefrom and provided with a collar portion 112 at its opposite end in which the rod 106 is slidably received. The upper end of the rod 108 is preferably provided with a button or handle 114 to facilitate manual grasping of the same. It will be appreciated that if the driver of the automobile presses downwardly on the button 114 he will depress the rod 106 and cause the bell crank 100, as viewed in Fig. 6, to be rotated about the rivet or pin 102 in a clockwise direction of rotation which will cause the associated bar member 90, and the bar member 90 on the opposite support 14 through the intermediary of the rod 96, to move to the right as viewed in Fig. 6 against the force of the springs 94 and thus cause the double armed levers 78 to pivot about their pivot pins 82 and withdraw the corresponding pins 84 from the openings 70 in the rails 20 then engaged thereby, upon which the seat may be slid forwardly or backwardly within the limits of movement of the slides 22 on the rails 20 and when adjusted to the desired position, release of pressure on the button 114 will permit the springs 94 to return the bar members 90 and consequently the double armed levers 78 and pins 84 to a position in which the slides 22 are locked against movement with respect to their corresponding rails 20.

In Fig. 9 a modified form of construction is shown for the rails and slides the rail here being indicated at 20' and the slide at 22', and other equivalent parts being numbered the same as in the preceding views except that such numerals bear a prime mark. It will be observed here that the particular conformation of these parts is changed from those previously described. The seam 36' for the rail 20' for instance is located at one lower corner of the rail and the rail is formed to provide a downwardly extending flange 120 along the opposite lower edge, this having the effect of strengthening the rail longitudinally thereof. In this construction, instead of providing a single row of balls 50 between the upper wall of the rail and slide, respectively, as in the previously described construction, two laterally spaced walls 50' are employed, such upper walls of the rail and slide being correspondingly changed to provide two pairs of oppositely disposed races for reception of the balls 50'. The slide 22' in this case has the free edges of the blanks from which it is formed brought together and welded centrally of the lower wall thereof as indicated at 122 but otherwise the construction is substantially the same as that previously described and it will be observed that it will function in a similar manner. It will also be understood that the balls 50' and 52' are maintained under compression between their respective raceways and that possibly because of the greater number of balls 50' laterally spaced in the manner illustrated a slightly more rigid structure may result.

In the construction illustrated in Fig. 10 the rail 20'' and the slide 22'' are both of generally circular conformation. The rail 20'' is provided with three longitudinally extending equally angularly spaced outwardly facing raceways 40'' therein and the slide 22'' is provided with a corresponding number of inwardly facing raceways 44'' and ball bearings 124 are received between each opposed pair of said raceways, the ball bearings 124 being maintained under compression in substantially the same general manner as described in connection with the previous constructions. Likewise a cage member 56'' corresponding to the cage member 56 previously described is provided between the members 20'' and 22'' to maintain the longitudinal spacing of the various ball bearings 124.

In the construction illustrated in Fig. 11 neither the rail or slide member is truly of tubular construction although the particular construction of the rail shown approaches the same. The rail 130 in this case is of T-section formed by bending a sheet of metal to provide a pair of spaced web portions 132 and oppositely extending flange portions 134 formed by bending the metal back upon itself and both of which provide the head of the T. The upper wall of the head of the T between the wall portions 132 is formed to provide an upwardly opening ball race 136 and each flange portion 134 is formed to provide a downwardly opening ball race 138. The slide 140 is formed from a single sheet of metal into generally rectangular cross-sectional configuration with the free edges of the blank brought into adjacent but spaced relation with respect to each other centrally of the lower wall to provide a slot 142 in which the leg of the T of the rail projects and is freely movable with the head of the T of the rail received within the slide. As in the construction first described the upper wall of the slide 140 centrally thereof is formed to provide a downwardly opening race 144 opposed to the raceway 136 and its opposite inwardly extending bottom wall portions are each formed to provide an upwardly opening race 146 arranged in opposed relation with respect to the corresponding race 138 of the rail. Ball bearings 150 are interposed between each corresponding opposed pair of these races and a suitably formed cage member 152 is provided in cooperating relation therewith to maintain the longitudinal spacings of the various balls 150. As in the previous constructions the proportion and arrangement of the parts is such that the various balls 150 are maintained during assembly under a compressive stress. It will be observed that in the construction illustrated in Fig. 11 the weight of the seat and its occupants is transmitted to the rail through a single row of balls 150 while the slide is maintained firmly drawn downwardly upon the rails by a double pair of balls 150. It will, of course, be understood that the function of the construction illustrated in Fig. 11 is substantially the same as that in the previously described constructions.

Formal changes may be made in the specific embodiments of the invention described without departing from the spirit or substance of the broad invention, the scope of which is commensurate with the appended claims.

What I claim is:

1. In a seat slide structure adapted to be supported on a floor or other supporting structure, in combination, a pair of relatively slidable members having adjacent and parallel wall surfaces, one of said surfaces having a plurality of openings arranged in line therethrough, the other of said members having an opening therethrough arranged at such different height from the floor than any one of said plurality of openings when vertically aligned therewith as to enable it to be brought into approximate but permanently out of true registry with any one of the first mentioned openings, a pin carried by one of said members and projectable through the last mentioned opening into any one of the first mentioned openings, said pin being of tapered conformation and of such size as to simultaneously bear against a margin of the second mentioned opening at one point and the diametrically opposite margin of the associated one of the first mentioned openings, and means for supporting said pin from movement into and out of operative relation with respect to the first mentioned openings.

2. In a seat slide structure, in combination, a rail member and a slide member, one of said members adapted to be mounted on a support, one of said members having a plurality of aligned holes therethrough and the other of said members having a hole therethrough, the holes in one of said members and the hole of the other of said members, respectively, being at different distances from said support, whereby said holes in said respective members have only approximate alignment, all of said holes having frusto-conical bounding walls, and a generally frusto-conical pin element adapted for simultaneous engagement with the wall of the last mentioned opening and the wall of any one of the first mentioned openings at diametrically opposite points in the engaged walls of the respective openings.

3. In a seat slide structure, in combination, a slide member and a rail member, one of said members having a series of openings therein arranged in line, the other of said members having an opening therein arranged to be approximately aligned with any one of the first mentioned openings, a pin projectable through the second mentioned opening into engagement with any one of the first mentioned openings, a lever carried by one of said members supporting said pin for movement into and out of engageable relation with respect to the first mentioned opening, a bar part projecting transversely through the one of said members on which said lever is supported and extending into substantially contacting relation with respect to said lever, lugs on said bar member extending over that side of said lever opposite said bar member, and a spring means constantly urging said bar member and said lever toward a position in which said pin is projected into one of the first mentioned openings.

4. In an automobile seat slide structure, in combination, inner and outer members arranged in telescopic relation, said outer member generally surrounding said inner member, raceways interiorly of said outer member generally above and below said inner member, raceways on the upper and lower sides of said inner member cooperating respectively with the upper and lower raceways in said outer member and rolling anti-friction means in each pair of cooperating raceways serving to maintain said inner and outer members assembled as an operative unitary structure applicable to and removable from an automobile as such, the raceways of each cooperating pair of raceways when said inner and outer members are in free unstressed condition being spaced apart a distance slightly less than the diameter of the rolling anti-friction means to be used therein and at least one of said members being sufficiently yieldable to permit said rolling anti-friction means to be forced between said members to spring at least one of them during the assembly of said anti-friction means and said members and to thereafter maintain a force of compression on said anti-friction means during use of said seat slide structure.

5. In an automobile seat slide structure in combination an outer member having top, bottom, and side walls, an inner member generally enclosed within said walls and arranged in generally telescopic relation with respect to said outer member, said inner member having raceways thereon on the upper and lower surfaces thereof, raceways interiorly of said outer member interiorly of the top wall of said outer member and interiorly of the bottom wall of said outer member, the raceways on said outer member forming cooperating pairs with the corresponding raceways on said inner member and rolling anti-friction means in each pair of cooperating raceways serving to maintain said inner and outer members operatively assembled as a unitary structure applicable to and removable from an automobile as such, the raceways of each cooperating pair of raceways when said inner and outer members are in free unstressed condition being spaced apart a distance slightly less than the diameter of the rolling anti-friction means to be used therein and at least one of said members being sufficiently yieldable to permit said rolling anti-friction means to be forced between said members to spring at least one of them during the assembly of said anti-friction means and said members and to thereafter maintain a force of compression on said anti-friction means during use of said seat slide structure.

6. In an automobile seat slide structure in combination an outer member having a top wall, a pair of side walls depending from said top wall and inwardly directed flanges on said side walls serving to together provide at least a portion of a bottom wall, an inner member generally enclosed within said walls and arranged in generally telescoping relation with respect to said outer member, said inner member having at least one raceway on its upper surface serving to cooperate with a cooperating raceway on the interior surface of said top wall, said inner member having a pair of raceways on its lower surface, each serving to cooperate with a pair of respectively cooperating raceways formed interiorly of said flanges which constitute the bottom wall portion of said outer member, rolling anti-friction means in each pair of cooperating raceways serving to maintain said inner and outer members operatively assembled as a unitary structure applicable to and removable from an automobile as such, the raceways of each cooperating pair of raceways when said inner and outer members are in free unstressed condition being spaced apart a distance slightly less than the diameter of the rolling anti-friction means to be used therein and at least one of said members being sufficiently yieldable to permit said rolling anti-friction means to be forced between said members to spring at least one of them during the assembly of said anti-friction means and said members and to thereafter maintain a force of compression on said anti-friction means during use of said seat slide structure.

7. In an automobile seat slide structure, in combination, an outer member, said outer member being generally channel-shaped and being provided with inturned flanges extending along the side walls of said channel, an inner member having laterally projecting flanges each disposed opposite from and in spaced relation to the inturned flanges on said channel-shaped outer member, said inner member being disposed interiorly of said outer member, extending longitudinally thereof and in generally telescoping relation with respect thereto, said inner member having a portion extending between the inturned flanges of said outer member, the interior surfaces of the inturned flanges on said outer member and the facing portions of the laterally projecting flanges on said inner member constituting two cooperating pairs of raceways adapted to receive rolling anti-friction means therebetween, the base of the channel outer member and the facing portion of said inner member similarly providing at least one pair of raceways adapted to receive rolling anti-friction means therebetween, and rolling anti-friction means in each pair of cooperating raceways serving to maintain said inner and outer members operatively assembled as a unitary structure applicable to and removable from an automobile as such, the raceways of each cooperating pair of raceways when said inner and outer members are in free unstressed condition being spaced apart a distance slightly less than the diameter of the rolling anti-friction means to be used therein, and at least one of said members being sufficiently yieldable to permit said rolling anti-friction means to be forced between said members to spring at least one of them during the assembly of said anti-friction means and said members and to thereafter maintain a force of compression on said anti-friction means during use of said seat slide structure.

8. In an automobile seat structure, in combination, an outer member, said outer member being generally channel-shaped and being disposed with its base upper-most and downwardly extending side walls provided with inturned flanges, an inner member extending upwardly entering between said inturned flanges of said outer member and having laterally projecting flanges disposed opposite from and in spaced relation to the inturned flanges on said channel-shaped outer member, the flanges of said inner member being disposed interiorly of said outer member extending longitudinally thereof and in generally telescoping relation with respect thereto, the upper surfaces of said inturned flanges on said outer member and the lower surfaces of the laterally projecting flanges on said inner member together constituting two cooperating pairs of raceways adapted to receive rolling anti-friction means therebetween, the interior of the base of the channel-shaped outer member and the upper surface of said inner member together comprising at least one pair of cooperating raceways adapted to receive rolling anti-friction means therebetween, and rolling anti-friction means in each pair of cooperating raceways serving to maintain said inner and outer members operatively assembled as a unitary structure applicable to and removable from an automobile as such, the raceways of each cooperating pair of raceways when said inner and outer members are in free unstressed condition being spaced apart a distance slightly less than the diameter of the rolling anti-friction means to be used therein, and at least one of said members being sufficiently yieldable to permit said rolling anti-friction means to be forced between said members to spring at least one of them during the assembly of said anti-friction means and said members and to thereafter maintain a force of compression on said antifriction means during use of said seat slide structure.

BENJAMIN A. WOINA.